(12) United States Patent  (10) Patent No.: US 12,342,085 B2
Strandborg et al.  (45) Date of Patent: Jun. 24, 2025

(54) TEMPORAL RECONSTRUCTION USING RAW IMAGE DATA AND PREVIOUS IMAGES

(71) Applicant: Varjo Technologies Oy, Helsinki (FI)

(72) Inventors: Mikko Strandborg, Hangonkylä (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 112 days.

(21) Appl. No.: 18/518,572

(22) Filed: Nov. 23, 2023

(65) Prior Publication Data

US 2025/0175711 A1    May 29, 2025

(51) Int. Cl.
*H04N 23/84* (2023.01)
*G06T 5/70* (2024.01)
*G06T 7/70* (2017.01)
*H04N 23/68* (2023.01)

(52) U.S. Cl.
CPC ............. *H04N 23/843* (2023.01); *G06T 5/70* (2024.01); *G06T 7/70* (2017.01); *H04N 23/683* (2023.01); *G06T 2207/10016* (2013.01); *G06T 2207/10024* (2013.01); *G06T 2207/30244* (2013.01)

(58) Field of Classification Search
CPC ...... H04N 23/843; H04N 23/683; G06T 5/70; G06T 7/70; G06T 2207/10016; G06T 2207/10024; G06T 2207/30244
USPC .......................................................... 348/241
See application file for complete search history.

(56) References Cited

U.S. PATENT DOCUMENTS

| | | | | |
|---|---|---|---|---|
| 5,619,258 A | * | 4/1997 | Gillespie | H04N 5/257 348/97 |
| 6,335,985 B1 | * | 1/2002 | Sambonsugi | G06V 10/255 382/190 |
| 6,606,458 B2 | * | 8/2003 | Umeda | H04N 23/58 396/110 |
| 6,771,306 B2 | * | 8/2004 | Trajkovic | G01S 3/7865 348/170 |
| 7,271,830 B2 | * | 9/2007 | Robins | H04N 23/6811 348/208.6 |
| 7,822,329 B2 | * | 10/2010 | Huang | G03B 9/64 348/208.99 |
| 2003/0151672 A1 | * | 8/2003 | Robins | H04N 23/6811 348/208.6 |

(Continued)

*Primary Examiner* — Usman A Khan
(74) *Attorney, Agent, or Firm* — Ziegler IP Law Group, LLC.

(57) ABSTRACT

Disclosed is imaging system with image sensor; pose-tracking means; and processor(s) configured to capture a sequence of images to determine corresponding poses of the image sensor with respect to which images are captured, wherein when capturing image, the processor(s) is configured to perform demosaicing on image data; identify static region(s) in the image(s); obtain new image data to determine a new pose of image sensor; reproject image(s) from a corresponding pose of image sensor with respect to which image(s) is captured to new pose of image sensor, wherein static region(s) in the image(s) is reprojected to generate reprojected static region(s); and generate a new image corresponding to the new image data, by performing temporal reconstruction of static region(s) in the new image that corresponds to the static region(s) of the image(s), based on the reprojected static region(s) of the reprojected image(s).

15 Claims, 3 Drawing Sheets

(56) References Cited

U.S. PATENT DOCUMENTS

| | | | |
|---|---|---|---|
| 2004/0135768 A1* | 7/2004 | Gu | G09G 3/22 |
| | | | 345/156 |
| 2004/0239776 A1* | 12/2004 | Shinohara | H04N 23/661 |
| | | | 348/E5.042 |
| 2005/0093986 A1* | 5/2005 | Shinohara | H04N 1/00151 |
| | | | 348/208.1 |
| 2017/0085796 A1* | 3/2017 | Rangam | H04N 23/62 |
| 2019/0356851 A1* | 11/2019 | Ayalasomayajula | H04N 5/772 |
| 2023/0388663 A1* | 11/2023 | Sokeila | H04N 23/632 |

* cited by examiner

TEMPORAL RECONSTRUCTION USING RAW IMAGE DATA AND PREVIOUS IMAGES

TECHNICAL FIELD

The present disclosure relates to imaging systems for temporal reconstruction using raw image data and previous images to reduce image artefacts. Moreover, the present disclosure also relates to methods for imaging for temporal reconstruction using raw image data and previous images to reduce image artefacts.

BACKGROUND

In the domain of imaging systems, there has been a consistent pursuit to achieve higher-quality image capture and reconstruction. Generally, temporal reconstruction refers to the process of reconstructing or generating a temporally stable and high-quality image or image sequence from a series of input image frames. While the temporal reconstruction can improve image quality and reduce artifacts, it also comes with its own technical challenges. For example, various artifacts, including blur, ghosting, and judder, can be introduced during the reconstruction process. Reducing these artifacts while preserving image quality is a complex task. Conventional imaging systems often struggle to accurately capture and reproduce static and dynamic scenes in a real-world environment leading to image artefacts and reduced image fidelity.

Conventionally, temporal accumulation of color samples from a camera feed have been used in image and video processing, for example, to reduce artifacts, such as temporal flickering or jitter. This technique involves collecting color information over multiple consecutive frames, which over time can help mitigate the blurriness by capturing the object's position and color over multiple frames. Moreover, during image processing of a sequence of image frames, temporal aliasing often manifests as flickering or jagged edges in fast-moving objects or scenes with rapidly changing details. Thus, there exists a technical problem of how to reproduce static and dynamic scenes in a real-world environment by an imaging system without causing noticeable artefacts and blurriness and without increasing processing complexity.

Therefore, in the light of the foregoing discussion, there exists a need to overcome the aforementioned drawbacks.

SUMMARY

The aim of the present disclosure is to provide an imaging system and a method for imaging for temporal reconstruction using raw image data and previous images to reduce image artefacts. The aim of the present disclosure is achieved by an imaging system and a method for imaging, where the method is implemented by the imaging system for enhancing temporal reconstruction as defined in the appended independent claims to which reference is made to. Advantageous features are set out in the appended dependent claims.

Embodiments of the present disclosure substantially eliminate or at least partially address the aforementioned problems in the prior art and enable integration of pose tracking and temporal reconstruction for improving image quality with significantly reduced image artefacts, where static regions representing static objects are identified and temporal reconstruction is performed to enhance the static regions in the resulting image while reducing the computational processing complexity.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
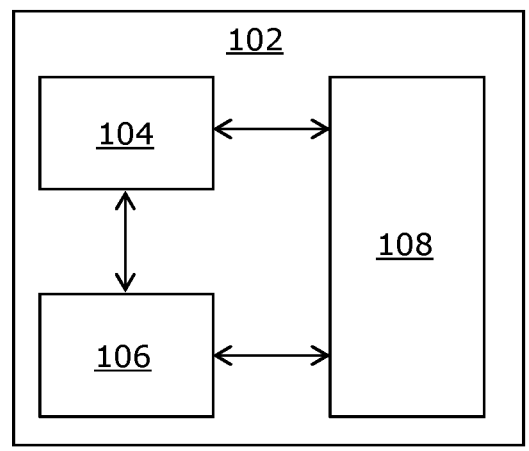
FIG. 1 is an illustration of a block diagram of an imaging system, in accordance with an embodiment of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides an imaging system comprising:
  an image sensor;
  pose-tracking means; and
  at least one processor configured to:
    capture, via the image sensor, a sequence of images of a real-world environment, whilst processing pose-tracking data, collected by the pose-tracking means, to determine corresponding poses of the image sensor with respect to which said images of said sequence are captured, wherein when capturing a given image of said sequence, the at least one processor is configured to perform demosaicing on image data read out by the image sensor;
    for at least one image of said sequence, identify at least one static region in the at least one image that represents at least one static object in the real-world environment;
    obtain new image data read out by the image sensor, whilst processing the pose-tracking data, collected by the pose-tracking means, to determine a new pose of the image sensor with respect to which the new image data is read out by the image sensor;
    reproject the at least one image from a corresponding pose of the image sensor with respect to which the at least one image is captured to the new pose of the image sensor, wherein the at least one static region in the at least one image is reprojected to generate at least one reprojected static region; and
    generate a new image corresponding to the new image data, by performing temporal reconstruction of at least one static region in the new image that corresponds to the at least one static region of the at least one image, based on the at least one reprojected static region of the at least one reprojected image and a part of the new image data that corresponds to the at least one reprojected static region.

In a second aspect, an embodiment of the present disclosure provides a method for imaging, the method being implemented by an imaging system comprising an image sensor, pose-tracking means and at least one processor, the method comprising:

capturing a sequence of images of a real-world environment, whilst processing pose-tracking data, collected by the pose-tracking means, to determine corresponding poses of the image sensor with respect to which said images of said sequence are captured, wherein at the step capturing a given image of said sequence, the at least one processor is configured to perform demosaicing on image data read out by the image sensor;

for at least one image of said sequence, identifying at least one static region in the at least one image that represents at least one static object in the real-world environment;

obtaining new image data read out by the image sensor, whilst processing the pose-tracking data, collected by the pose-tracking means, to determine a new pose of the image sensor with respect to which the new image data is read out by the image sensor;

reprojecting the at least one image from a corresponding pose of the image sensor with respect to which the at least one image is captured to the new pose of the image sensor, wherein the at least one static region in the at least one image is reprojected to generate at least one reprojected static region; and generating a new image corresponding to the new image data, by performing temporal reconstruction of at least one static region in the new image that corresponds to the at least one static region of the at least one image, based on the at least one reprojected static region of the at least one reprojected image and a part of the new image data that corresponds to the at least one reprojected static region.

The present disclosure provides the aforementioned imaging system and the aforementioned method for imaging that enables temporal reconstruction using raw image data and previous images to reduce image artefacts. The imaging system uses the pose-tracking means that enables precise estimation of the image sensor's position and orientation across multiple frames with subpixel accuracy. The level of precision is useful for enhancing the overall image quality. The imaging system distinguishes between dynamic (moving) regions and static regions within the captured sequence of images. The distinction between the dynamic regions and the static regions is essential for deciding how to process each region optimally. The imaging system reprojects the previous image to the new camera pose in static regions of the image, where the image sensor's previous image data is available. The reprojected image may serve as a reference for enhancing the image quality. For static regions with available previous image data, the imaging system performs temporal reconstruction and temporal accumulation. The imaging system treats incoming raw camera pixel values as fresh samples, allowing for the improvement of image quality over time using well-established Temporal Anti-Aliasing (TAA) reconstruction techniques. The method described herein is simple, effective, reliable, and easy to implement.

The term "imaging system" refers to a system for imaging a real-world environment. The imaging system may be used for imaging real-world environments for a variety of applications including but not limited to extended-reality (XR), inspection of the real-world environment, machine vision, gaming, art, and so forth. Notably, the imaging system is specialized equipment for capturing the sequence of images and also generating a new image by performing automatic demosaicing, denoising and superresolution for static content, where the image quality is mainly limited by the accuracy of the tracking system. Notably, the imaging system enhances the quality of a said image in real-time or near-real time.

Throughout the present disclosure, the term "image sensor" refers to a device which detects light from a real-world environment at its photo-sensitive surface, when said light is incident thereupon. The image sensor comprises a plurality of photo-sensitive elements, which collectively form the photo-sensitive surface of the image sensor. Upon such detection of the light from the real-world environment, the plurality of photo-sensitive elements captures a sequence of images for the real-world environment. The sequence of images are electrical signals pertaining to a real-world scene of the real-world environment. Each of the images in the sequence of images is processed (by the at least one processor of the imaging system) to generate a new image. A given photo-sensitive element is known as a picture element, or a pixel. It will be appreciated that the plurality of photo-sensitive elements could be arranged in various ways (for example, such as a rectangular two-dimensional (2D) grid, a polygonal arrangement, a circular arrangement, an elliptical arrangement, a freeform arrangement, and similar) to form the photo-sensitive surface of the image sensor. Examples of the image sensor may include, but are not limited to, a charge-coupled device (CCD) image sensor, and a complementary metal-oxide-semiconductor (CMOS) image sensor.

Optionally, the image sensor comprises a plurality of pixels. Each pixel comprises at least three sub-pixels. The at least three sub-pixels may comprise RGB (red, green, and blue). It will be appreciated that each pixel may comprise more than three sub-pixels including but not limited to, RGBW (red, green, blue, and white), RGBY (red, green, blue, and yellow), and the like. The technical effect of the aforementioned sub-pixel configuration is to enable enhanced colour reproduction and image quality, offering greater flexibility in capturing and processing colour information.

Throughout the present disclosure, the term "pose-tracking means" refers to specialized equipment that is employed to detect and/or follow the pose (namely, a position and orientation) of the image sensor within the real-world environment. In practice, the aforesaid pose-tracking means is actually employed to track a pose of the image sensor.

Pursuant to embodiments of the present disclosure, the aforesaid pose-tracking means is implemented as a true SixDegrees of Freedom (6DoF) tracking system. In other words, said means track both the position and the orientation of the at least one camera within a three-dimensional (3D) space of the real-world environment, which is represented by the aforementioned global coordinate system. In particular, said pose-tracking means is configured to track translational movements (namely, surge, heave, and sway movements) and rotational movements (namely, roll, pitch, and yaw movements) of the at least one camera within the 3D space.

Throughout the present disclosure, the term "pose" refers to both position and orientation. Thus, the pose of the image sensor comprises 3D position and 3D orientation of the image sensor within the aforementioned 3D space of the real-world environment.

Throughout the present disclosure, the term "processor" refers to hardware, software, firmware, or a combination of these, suitable for controlling the operation of the imaging system. The at least one processor is communicably coupled with the image sensor and the aforesaid pose-tracking means. In this regard, the term "at least one processor" refers to "one processor" in some implementations, and "a plurality of processors" in other implementations. In some implementations, the "at least one processor" is implemented as a processor of the image sensor. In other implementations, the at least one processor is implemented as the processor of the image sensor and a processor of an external computing device, wherein the external computing device is communicably coupled with the image sensor. In such a case, at least a part of all the aforementioned processing tasks of the at least one processor is performed at the processor of the external computing device. This considerably reduces processing burden on the processor of the image sensor. The at least one processor could be implemented as any one of: a microprocessor, a microcontroller, or a controller. As an example, the at least one processor could be implemented as an application-specific integrated circuit (AISC) chip, or a reduced instruction set computer (RISC) chip.

The at least one processor captures the sequence of images of a real-world environment. The sequence of images is captured via the image sensor of the imaging system. Herein, the term "sequence of images" is referred to as multiple images captured by the image sensor in succession. In this regard, while the at least one processor is capturing the sequence of images, the at least one processor simultaneously processes the pose-tracking data. The technical effect of the synchronized processing of the pose-tracking data is to ensure accurate alignment and calibration of the images within the sequence, thereby guaranteeing faithful and precise representation of the real-world environment.

Throughout the present disclosure, the term "pose-tracking data" refers to information related to the position and orientation of the image sensor or camera in a real-world environment. The pose-tracking data is collected by the pose-tracking means. The pose-tracking data is processed to determine corresponding poses of the image sensor with respect to which said images of said sequence are captured. The pose-tracking means may be implemented as the multiple-tracking means for determining the corresponding pose of the image sensor at the sub-pixel accuracy. The pose-tracking means may be implemented as the multiple tracking means by systems including but not limited to, an optics-based tracking system (inside-out and/or outside-in), a magnetism-based tracking system, an accelerometer, a gyroscope, an Inertial Measurement Unit (IMU), a Timing and Inertial Measurement Unit (TIMU). The accuracy of the pose could be improved by correlating the pose-tracking data of the multiple tracking means. For determining a given pose corresponding to a better tracking quality as a frame of reference for adjusting another pose corresponding to a lower tracking quality ensures improvement in the accuracy of the another pose upon adjustment, whilst also ensuring that the accuracy of the given pose is not compromised in making said adjustment. The imaging system's ability to determine the exact pose of the camera with subpixel accuracy ensures that the images are correctly aligned and calibrated, reducing distortions and artefacts.

The at least one processor, while capturing a given image of the said sequence, performs demosaicing on image data read out by the image sensor. Herein, the term "demosaicing" refers to an image processing technique used to reconstruct a full-colour image from the image sensor that captures only partial colour information at each pixel location. The demosaicing includes interpolating missing colour values at each of the given pixel by considering colour information from neighbouring pixels with different colour filter values. The demosaicing is performed on the image data i.e. raw image data read out by the image sensor in order to improve the quality and resolution of the given images captured through the image sensor, particularly those that use a Bayer colour filter array or similar technology to capture colour information.

The at least one processor, for at least one image of the said sequence, identifies at least one static region in the at least one image that represents at least one static object in the real-world environment. In this regard, the at least one static region can be identified by comparing content represented in a static region of the at least one image with the content represented in a corresponding region of at least one previous image in said sequence. Such a comparison can be performed by reprojecting one of: the at least one image, the at least one previous image from its corresponding camera pose to a camera pose of another of: the at least one image, the at least one previous image. Such a comparison also considers the camera motion, namely, the change in the camera pose from the at least one previous image to the at least one image. The imaging system significantly enhances the quality of the captured sequence of images. The technical effect of identifying the at least one static region in the at least one image is to optimize the processing of both dynamic and static components within the image, ultimately leading to the production of images that are notably enhanced in clarity and sharpness.

The at least one processor is configured to obtain new image data read out by the image sensor. In this regard, while the at least one processor is obtaining new image data read out by the image sensor, the at least one processor is simultaneously configured to process pose-tracking data collected by the pose-tracking means. The new image data is obtained to determine a new pose of the image sensor with respect to which the new image data is read out by the image sensor. The technical effect of the at least one processor simultaneously obtaining new image data from the image sensor while processing the pose-tracking data collected by the pose-tracking means is to enable the precise determination of a new pose for the image sensor. This new pose represents the camera's position and orientation concerning the newly acquired image data. This concurrent processing enhances the system's ability to maintain accurate and real-time alignment of the image sensor, ensuring that it captures images from the correct perspective in the ever-changing real-world environment.

The at least one processor is configured to reproject the at least one image from a corresponding pose of the image sensor with respect to which the at least one image is captured to the new pose of the image sensor. In this regard, the at least one static region in the at least one image is reprojected to generate at least one reprojected static region. The technical effect of the at least one processor's ability to reproject the image from its original capture pose to the new pose of the image sensor is to ensure that the entire image, including its static regions, maintains accurate alignment and perspective. Specifically, this process facilitates the creation of reprojected static regions within the image, which are useful for preserving the stable representation of static objects in the real-world environment. This alignment and preservation of static regions contribute to the overall consistency and accuracy of the imagery, particularly when dealing with dynamic camera movements or changing viewpoints.

The at least one processor is configured to generate a new image corresponding to the new image data. The new image corresponding to the new image data is generated by performing temporal reconstruction of at least one static region in the new image that corresponds to the at least one static region of the at least one image, based on the at least one reprojected static region of the at least one reprojected image and a part of the new image data that corresponds to the at least one reprojected static region. The technical effect is that the at least one processor combines two sources of information, the reprojected static region, and the new image data, to create a new image. The generated new image is more refined, less noisy, and has higher resolution in static regions. Essentially, the at least one processor smooths out the static regions of the image, reducing artefacts and enhancing overall image quality. The soothing out of static regions of the image is particularly beneficial in scenarios where capturing clear and detailed images is critical, such as in photography, medical imaging, or surveillance.

Optionally, the temporal reconstruction of the at least one static region in the new image is performed using at least one temporal anti-aliasing (TAA) technique. The "at least one temporal anti-aliasing technique" corresponds to well-known technique in computer graphics widely used in many high-budget console and PC games. The TAA technique reduces computational processing. The TAA techniques work by comparing information from the previous image to the new image, in order to reduce flickering, jagged edges, and other visual anomalies commonly seen in dynamic or moving scenes. The TAA technique is used to improve the overall image quality and create more realistic and visually appealing images. The technical effect of using at least one (TAA) technique is to efficiently reduce computational processing while improving image quality. Moreover, the temporal antialiasing is also suitable for superresolution, simply by making the target framebuffer larger resolution than the input image. Furthermore, the temporal anti-aliasing provides an implicit denoising due to it averaging samples over longer time period, therefore making it suitable for various stochastic rendering methods. In other words, the camera jitter comes from the natural movement of the head (in case of HMDs) or the hand (in case of handheld devices such as mobile phones and the like). Moreover, by using the pose-tracking means and the image sensor data, a 3 or 6DOF reprojection of the previously generated image can be performed that can be further used to accumulate the colour samples over several frames.

Optionally, when generating the new image, the at least one processor is configured to generate a given pixel of the new image by utilising a value of a single sub-pixel that is provided for a given location of the given pixel of the new image in said part of the new image data. In this regard, it is noted that only one colour component (single sub-pixel value) is provided at each location (pixel location) of the said images in the sequence of images. The technical effect of generating each pixel is to simplify the image generation process and efficiently manage colour information. The generation of each pixel of the new image streamlines computational workload and optimizes resource usage, making it well-suited for scenarios where resource efficiency and image generation speed are highly required.

Optionally, the at least one processor is configured to perform a temporal accumulation of one or more images of said sequence in a history buffer, based on a match between values of pixels of a given image of said sequence and values of individual sub-pixels that are provided for corresponding locations of said pixels in the new image data. In this regard, it is noted that the at least one image is from amongst the one or more images that are temporally accumulated in the history buffer. The at least one image is the same image that was used for temporal reconstruction. While performing the temporal accumulation, the image sensor data contains only one colour component (single sub-pixel value) per pixel location, therefore the history rejection is based on only that colour channel. The technical effect of performing temporal accumulation of the one or more images is to allow the imaging system to integrate information from multiple images over time, emphasizing areas of the image that show consistency or similarity across frames. This leads to improved image quality, reduced noise, and enhanced detail in areas that remain relatively constant throughout the sequence of images. The temporal accumulation is particularly useful for achieving higher resolution and clarity in specific parts of the image, which may be valuable in applications like image enhancement and super-resolution.

Optionally, the at least one processor is configured to determine whether the at least one reprojected static region of the at least one reprojected image includes any disocclusion. In this regard, when generating the new image, the at least one processor is configured to perform said temporal reconstruction of the at least one static region in the new image, only when it is determined that the at least one reprojected static region of the at least one reprojected image does not include any disocclusion. The technical effect is to ensure that the temporal reconstruction is applied selectively, focusing on static regions that remain consistent and uninterrupted over time. By excluding regions with disocclusions, the at least one processor avoids introducing artefacts or inaccuracies into the new image, resulting in higher-quality and more reliable image generation. The temporal construction is particularly important in applications where image integrity and precision are critical, such as medical imaging or surveillance.

In an implementation scenario, whenever a new image is generated, previous image of a canvas is moved to match new image sensor pose (i.e., reprojection) and areas that include disocclusion, or the areas that include a dynamic content, or the areas that trigger history rejection heuristics are reset to an upscaled version of the demosaiced image. After that, each subpixel in an image sensor array takes a small piece of the subpixel's colour and puts the subpixel's colour on the canvas at that location over a few images to generate an accurate image with high resolution.

Furthermore, the TAA could be used with jittering of the image sensor, so that each pixel is captured from different sample locations. As mentioned earlier, naturally-occurring jitter of the image sensor (for example, due to the natural movement of the head in case of HMDs or of the hand in case of handheld devices) is sufficient for the stochastic sampling. However, the image sensor could be additionally jittered, for example, by using a wobulator or an Optical Image Stabilisation system.

After the TAA, a reconstruction filter is applied that is used to search the previously accumulated colour data from the previous images by using image reprojection, such as 9DOF reprojection using motion vectors. Furthermore, history samples that are deemed to be invalid due to moving content, disocclusions, and the like are rejected, and the accumulation is started over for that pixel. Moreover, the TAA is also suitable for super resolution and making the target frame buffer larger resolution than the input image.

In some implementations, raw image sensor data includes only one-color component per pixel location, so that the history samples rejection has to be done based on only that colour channel. As a result, the exact pose of the image sensor with subpixel accuracy ensures that the images are correctly aligned and calibrated, reducing distortions and artefacts.

Optionally, when generating the new image, the at least one processor is configured to perform demosaicing on said part of the new image data, to generate the at least one static region in the new image, when it is determined that the at least one reprojected static region of the at least one reprojected image includes a disocclusion. in this regard, the at least one processor adapts its image generation approach based on the presence of disocclusions. When disocclusions are detected in the reprojected static region, the at least one processor applies demosaicing to maintain image quality, ensuring that the new image accurately represents the static regions, despite the missing data in the reprojected image. The technical effect of performing demosaicing is to enhance the overall image quality and fidelity in scenarios where disocclusions are common, such as in dynamic environments or surveillance applications.

Optionally, when generating the new image, the at least one processor is configured to perform denoising, in addition to the demosaicing, on said part of the new image data, to generate the at least one static region in the new image, when it is determined that the at least one reprojected static region of the at least one reprojected image includes the disocclusion. The imaging system handles scenarios where previous image data is missing due to disocclusions or being outside the camera frame by performing standard demosaicing and denoising, ensuring robust performance in various conditions. The technical effect is to optimize the new image generation process to handle disocclusions effectively. By performing both demosaicing and denoising, the at least one processor produces a high-quality, noise-free representation of the static regions, compensating for missing data caused by disocclusions.

Optionally, the at least one processor is configured to identify at least one dynamic region in the at least one image that represents at least one dynamic object in the real-world environment. In this regard, when generating the new image, the at least one processor is configured to perform demosaicing on another part of the new image data that represents the at least one dynamic object, to generate at least one dynamic region in the new image. The technical effect of identifying dynamic regions in the image is to ensure the accurate representation of moving objects in the real-world environment. By separately processing dynamic regions, the at least one processor maintains image quality and clarity for these areas, resulting in improved overall image fidelity, particularly in scenarios where dynamic objects are present.

Optionally, when generating the new image, the at least one processor is configured to perform denoising, in addition to the demosaicing, on another part of the new image data, to generate the at least one dynamic region in the new image. For images with dynamic regions, the imaging system applies existing demosaicing and denoising techniques. The technical effect of incorporating denoising, in addition to demosaicing, when generating the new image is to improve the quality of dynamic regions within the image. While the demosaicing process is applied to one part of the new image data to create the dynamic region, denoising is performed on another part of the data, utilizing well-established and widely recognized techniques.

Optionally, when generating the new image, the at least one processor is configured to employ, for the new image, an output framebuffer that is larger than at least one input framebuffer employed for the at least one image and another input framebuffer employed for the new image data. The technical effect of employing an output framebuffer is to allow a more efficient and flexible processing of the new image data. The output framebuffer provides ample space to perform various image manipulation tasks, potentially leading to improved image quality, increased detail, or the ability to apply more sophisticated image processing techniques. The imaging system may be particularly valuable in applications where advanced image processing is required, such as in computer graphics, video editing, or medical imaging, where preserving high-quality images is essential.

The present disclosure also relates to the method as described above. Various embodiments and variants disclosed above, with respect to the aforementioned imaging system, apply mutatis mutandis to the method.

Optionally, the image sensor comprises a plurality of pixels, each pixel comprising at least three sub-pixels, and the method comprises performing the temporal accumulation of one or more images of said sequence in a history buffer, based on a match between values of pixels of a given image of said sequence and values of individual sub-pixels that are provided for corresponding locations of said pixels in the new image data. The at least one image is from amongst the one or more images that are temporally accumulated in the history buffer.

Optionally, the method comprises identifying at least one dynamic region in the at least one image that represents at least one dynamic object in the real-world environment, wherein at the step of generating the new image, the method comprises performing demosaicing on another part of the new image data that represents the at least one dynamic object, to generate at least one dynamic region in the new image.

Optionally, at the step of generating the new image, the method comprises performing denoising, in addition to the demosaicing, on another part of the new image data, to generate the at least one dynamic region in the new image.

Optionally, at the step of generating the new image, the method comprises employing, for the new image, an output framebuffer that is larger than at least one input framebuffer employed for the at least one image and another input framebuffer employed for the new image data.

DETAILED DESCRIPTION OF THE DRAWINGS

Referring to FIG. 1, there are shown illustrations of a block diagram of an imaging system, in accordance with an embodiment of the present disclosure. With reference to FIG. 1, there is shown an imaging system 102. The imaging system 102 comprises an image sensor 104, a pose-tracking means 106, and at least one processor 108. The at least one processor 108 is communicably coupled to the image sensor 104 and the pose-tracking means 106 and is configured to perform the aforementioned operations, as described earlier.

Figure 2:
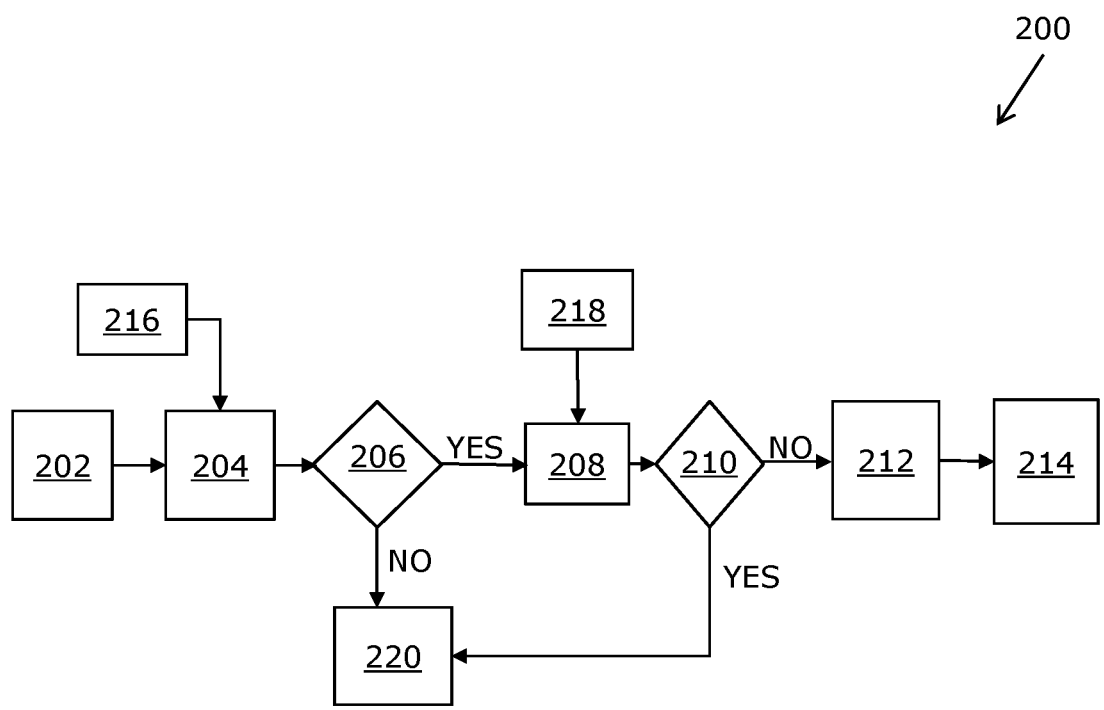
FIG. 2 is an illustration of a sequence diagram that depicts temporal reconstruction using raw image data and previous images, in accordance with an embodiment of the present disclosure.

Referring to FIG. 2, there is shown a sequence diagram that depicts a formation of an image, in accordance with an embodiment of the present disclosure. FIG. 2 is described in conjunction with elements from FIG. 1. With reference to FIG. 2, there is shown a sequence diagram 200 that includes operations from 202 to 220 to generate a new image corresponding to the new image data, by performing temporal reconstruction of at least one static region in the new image.

At operation 202, an image from a previous frame is combined with the previous image sensor pose that can be used to reproject the previous frame to a current frame. At operation 204, after the reprojection of the previous frames, a valid history sample for each pixel in the current frame is identified by combining the image from operation 202 and the pose-tracking data collected at operation 216. Furthermore, at operation 206 a decision is made, if there is no history sample, then, in that case, the pixel is reset to an upscaled version of the demosaiced image generated, such as at operation 220. In other words, if the history sample is not found, then, in that case, the pixel is normally demosaiced or denoised.

If at operation 216, the history sample is found, then at operation 208, after the validation of the history sample, the history sample is clamped to the neighbourhood of the current pixel as the history can be at a different location than the current pixel. At operation 208, the raw image sensor data 218 that includes only one colour component per pixel location is used for the history rejection that can be done based on only that color channel. At operation 210, if the history samples (e.g., the history rejection heuristics) are not rejected, for example, due to moving content, disocclusions, and the like, then, in that case a reconstruction filter is applied for the previously accumulated colour data from the previous frame by using image reprojection (e.g., for typically 9DOF reprojection using motion vectors), such as at operation 212. Alternately, if the history samples (e.g., the history rejection heuristics) are rejected, for example, due to moving content, disocclusions, and the like, then, in that case, the pixel is reset to an upscaled version of the demosaiced image generated, such as at operation 220. Finally, at operation 214, an output image, which is the blended image from the temporal reconstruction operation is generated that can be further used as the input image for the next frame. As a result, high-quality images with reduced noise, smooth edges, and adaptability to dynamic scenarios that are valuable for computer graphics and vision applications can be generated.

Figure 3:
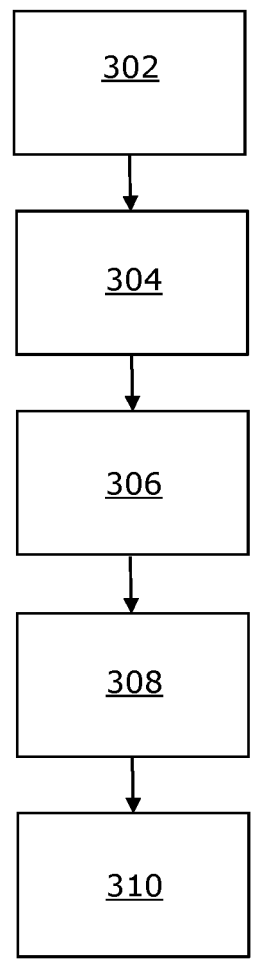
FIG. 3 is an illustration of steps of a method for imaging implemented in an imaging system, in accordance with an embodiment of the present disclosure.

Referring to FIG. 3, illustrated are steps of a method for imaging, in accordance with an embodiment of the present disclosure. The method is implemented by the imaging system 102 comprising the image sensor 104, the pose-tracking means 106 and the at least one processor 108. At step 302, a sequence of images of a real-world environment is captured, whilst processing pose-tracking data, collected by the pose-tracking means, to determine corresponding poses of the image sensor 104 with respect to which said images of said sequence are captured. At the step 302 of capturing a given image of said sequence, demosaicing is performed on image data read out by the image sensor 104. At step 304, for at least one image of said sequence, at least one static region is identified in the at least one image that represents at least one static object in the real-world environment. At step 306, new image data read out by the image sensor 104 is obtained, whilst processing the pose-tracking data, collected by the pose-tracking means 106, to determine a new pose of the image sensor 104 with respect to which the new image data is read out by the image sensor 104. At step 308, the at least one image is reprojected from a corresponding pose of the image sensor 104 with respect to which at least one image is captured to the new pose of the image sensor 104. The at least one static region in the at least one image is reprojected to generate at least one reprojected static region. At step 310, a new image is generated corresponding to the new image data, by performing temporal reconstruction of at least one static region in the new image that corresponds to the at least one static region of the at least one image, based on the at least one reprojected static region of the at least one reprojected image and a part of the new image data that corresponds to the at least one reprojected static region.

The aforementioned steps are only illustrative and other alternatives can also be provided where one or more steps are added, one or more steps are removed, or one or more steps are provided in a different sequence without departing from the scope of the claims herein.

The invention claimed is:

1. An imaging system comprising:
an image sensor;
pose-tracking means; and
at least one processor configured to:
capture, via the image sensor, a sequence of images of a real-world environment, whilst processing pose-tracking data, collected by the pose-tracking means, to determine corresponding poses of the image sensor with respect to which said images of said sequence are captured, wherein when capturing a given image of said sequence, the at least one processor is configured to perform demosaicing on image data read out by the image sensor;
for at least one image of said sequence, identify at least one static region in the at least one image that represents at least one static object in the real-world environment;
obtain new image data read out by the image sensor, whilst processing the pose-tracking data, collected by the pose-tracking means, to determine a new pose of the image sensor with respect to which the new image data is read out by the image sensor;
reproject the at least one image from a corresponding pose of the image sensor with respect to which the at least one image is captured to the new pose of the image sensor, wherein the at least one static region in the at least one image is reprojected to generate at least one reprojected static region; and
generate a new image corresponding to the new image data, by performing temporal reconstruction of at least one static region in the new image that corresponds to the at least one static region of the at least one image, based on the at least one reprojected static region of the at least one reprojected image and a part of the new image data that corresponds to the at least one reprojected static region.

2. The imaging system of claim 1, wherein the temporal reconstruction of the at least one static region in the new image is performed using at least one temporal anti-aliasing technique.

3. The imaging system of claim 1, wherein the image sensor comprises a plurality of pixels, each pixel comprising at least three sub-pixels, and wherein when generating the new image, the at least one processor is configured to generate a given pixel of the new image by utilizing a value of a single sub-pixel that is provided for a given location of the given pixel of the new image in said part of the new image data.

4. The imaging system of claim 1, wherein the image sensor comprises a plurality of pixels, each pixel comprising at least three sub-pixels, and wherein the at least one processor is configured to perform a temporal accumulation of one or more images of said sequence in a history buffer, based on a match between values of pixels of a given image of said sequence and values of individual sub-pixels that are provided for corresponding locations of said pixels in the new image data, wherein the at least one image is from amongst the one or more images that are temporally accumulated in the history buffer.

5. The imaging system of claim 1, wherein the at least one processor is configured to determine whether the at least one reprojected static region of the at least one reprojected image includes any disocclusion, wherein, when generating the new image, the at least one processor is configured to perform said temporal reconstruction of the at least one static region in the new image, only when it is determined that the at least one reprojected static region of the at least one reprojected image does not include any disocclusion.

6. The imaging system of claim 5, wherein when generating the new image, the at least one processor is configured to perform demosaicing on said part of the new image data, to generate the at least one static region in the new image, when it is determined that the at least one reprojected static region of the at least one reprojected image includes a disocclusion.

7. The imaging system of claim 6, wherein when generating the new image, the at least one processor is configured to perform denoising, in addition to the demosaicing, on said part of the new image data, to generate the at least one static region in the new image, when it is determined that the at least one reprojected static region of the at least one reprojected image includes the disocclusion.

8. The imaging system of claim 1, wherein the at least one processor is configured to identify at least one dynamic region in the at least one image that represents at least one dynamic object in the real-world environment, wherein when generating the new image, the at least one processor is configured to perform demosaicing on another part of the new image data that represents the at least one dynamic object, to generate at least one dynamic region in the new image.

9. The imaging system of claim 8, wherein when generating the new image, the at least one processor is configured to perform denoising, in addition to the demosaicing, on another part of the new image data, to generate the at least one dynamic region in the new image.

10. The imaging system of claim 1, wherein when generating the new image, the at least one processor is configured to employ, for the new image, an output framebuffer that is larger than at least one input framebuffer employed for the at least one image and another input framebuffer employed for the new image data.

11. A method for imaging, the method being implemented by an imaging system comprising an image sensor, a pose-tracking means and at least one processor, the method comprising:
   capturing a sequence of images of a real-world environment, whilst processing pose-tracking data, collected by the pose-tracking means, to determine corresponding poses of the image sensor with respect to which said images of said sequence are captured, wherein at the step of capturing a given image of said sequence, the method comprises performing demosaicing on image data read out by the image sensor;
   for at least one image of said sequence, identifying at least one static region in the at least one image that represents at least one static object in the real-world environment;
   obtaining new image data read out by the image sensor, whilst processing the pose-tracking data, collected by the pose-tracking means, to determine a new pose of the image sensor with respect to which the new image data is read out by the image sensor;
   reprojecting the at least one image from a corresponding pose of the image sensor with respect to which the at least one image is captured to the new pose of the image sensor, wherein the at least one static region in the at least one image is reprojected to generate at least one reprojected static region; and
   generating a new image corresponding to the new image data, by performing temporal reconstruction of at least one static region in the new image that corresponds to the at least one static region of the at least one image, based on the at least one reprojected static region of the at least one reprojected image and a part of the new image data that corresponds to the at least one reprojected static region.

12. The method of claim 11, wherein the image sensor comprises a plurality of pixels, each pixel comprising at least three sub-pixels, and wherein the method comprises performing a temporal accumulation of one or more images of said sequence in a history buffer, based on a match between values of pixels of a given image of said sequence and values of individual sub-pixels that are provided for corresponding locations of said pixels in the new image data, wherein the at least one image is from amongst the one or more images that are temporally accumulated in the history buffer.

13. The method of claim 11, wherein the method comprises identifying at least one dynamic region in the at least one image that represents at least one dynamic object in the real-world environment, wherein at the step of generating the new image, the method comprises performing demosaicing on another part of the new image data that represents the at least one dynamic object, to generate at least one dynamic region in the new image.

14. The method of claim 13, wherein at the time of generating the new image, the method comprises performing denoising, in addition to the demosaicing, on another part of the new image data, to generate the at least one dynamic region in the new image.

15. The method of claim 11, wherein at the step of generating the new image, the method comprises employing, for the new image, an output framebuffer that is larger than at least one input framebuffer employed for the at least one image and another input framebuffer employed for the new image data.

* * * * *